May 16, 1933.  K. SCHAUFLER  1,908,868
MACHINE FOR FOLDING NOODLES
Filed April 22, 1932  2 Sheets-Sheet 1
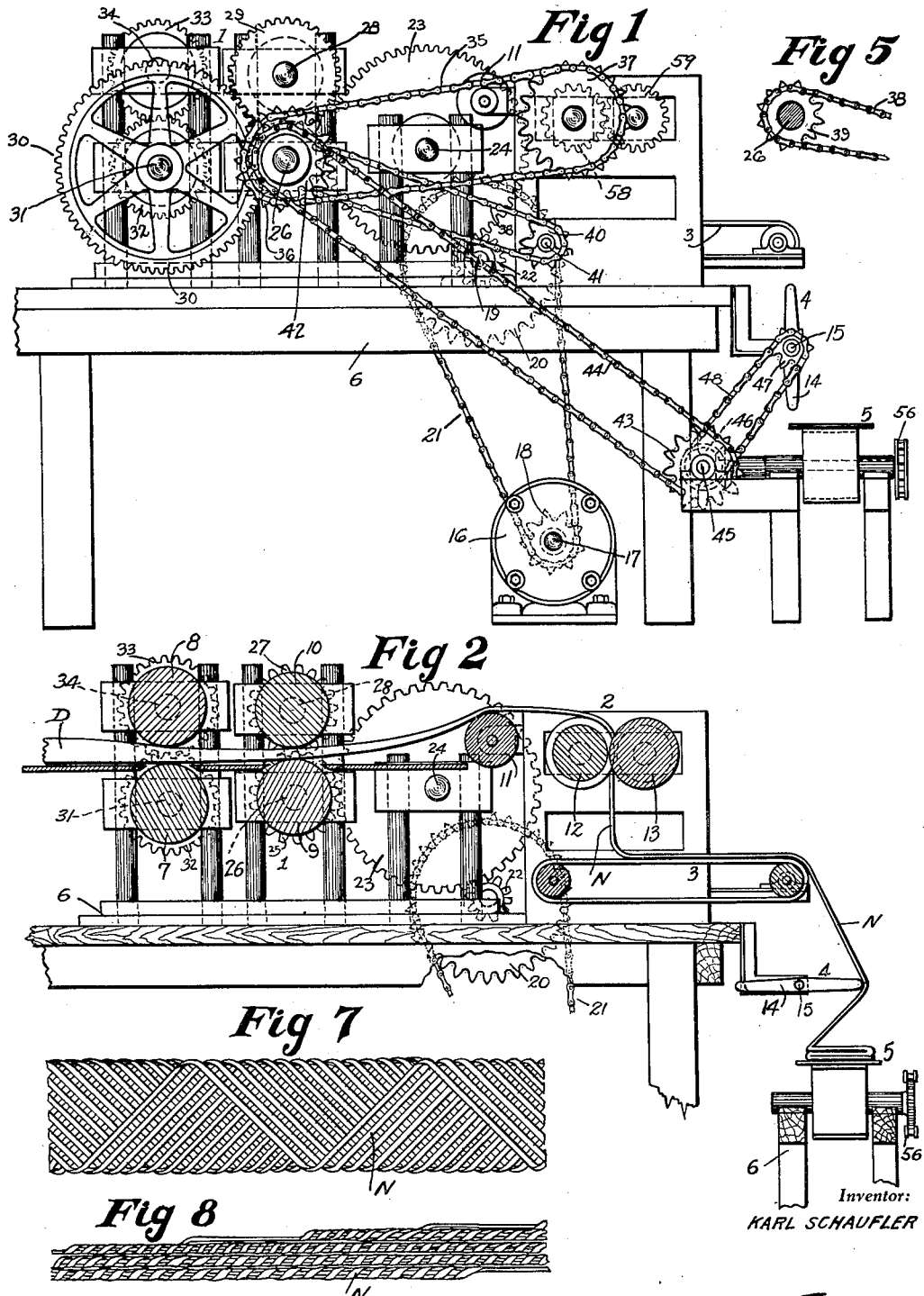
Inventor:
KARL SCHAUFLER
BY Alan Franklin
Attorney May 16, 1933. K. SCHAUFLER 1,908,868
MACHINE FOR FOLDING NOODLES
Filed April 22, 1932 2 Sheets-Sheet 2
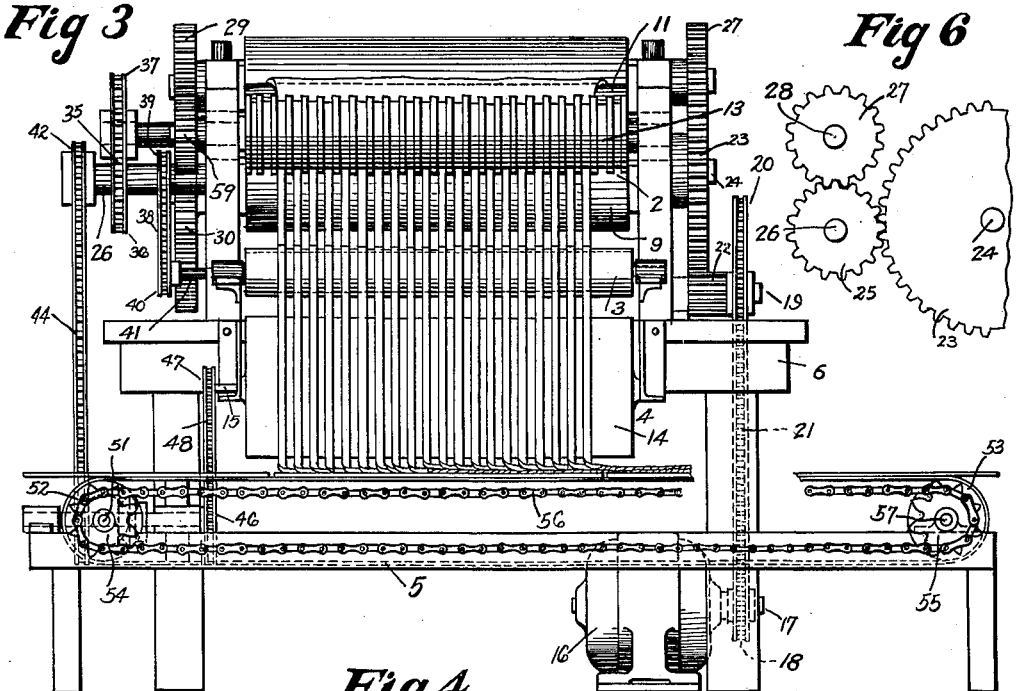
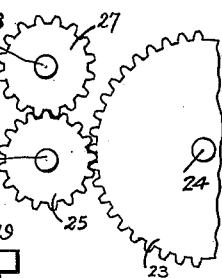
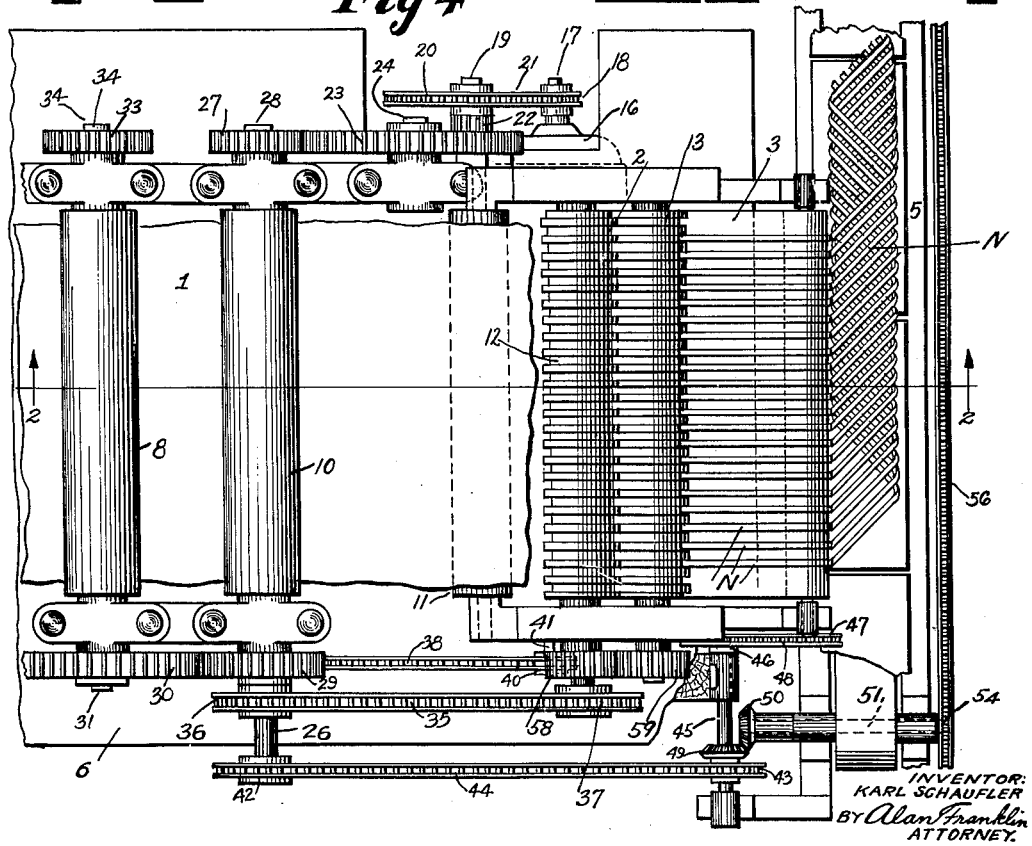
INVENTOR:
KARL SCHAUFLER
BY Alan Franklin
ATTORNEY.

Patented May 16, 1933

1,908,868

UNITED STATES PATENT OFFICE

KARL SCHAUFLER, OF LOS ANGELES, CALIFORNIA

MACHINE FOR FOLDING NOODLES

Application filed April 22, 1932. Serial No. 606,934.

This invention relates to machines for folding noodles, macaroni and other similar dough products, and the general object of the invention is to provide a machine which will fold such products in a novel and attractive manner, for packing, storage, transportation and culinary purposes.

A more particular object is to provide a machine of the character stated which will be simple in construction and highly efficient in operation.

Other objects and advantages will appear hereinafter.

The invention is illustrated in the annexed drawings which form a part of this specification and in which, Fig. 1 is a side elevation of my invention.

Fig. 2 is a vertical longitudinal section of my invention taken on line 2—2 of Fig. 4.

Fig. 3 is a front end elevation of my invention.

Fig. 4 is a plan view of my invention.

Fig. 5 is a fragmentary side view of a detail of the driving mechanism.

Fig. 6 is a fragmentary side elevation of another detail of the driving mechanism.

Fig. 7 is a plan view of one of the lengths cut off from the folded noodles.

Fig. 8 is a side view of Fig. 7.

Corresponding parts are designated by the same reference characters in all the figures.

My invention comprises generally dough compressing and feeding means 1; dough stripping means 2; a noodle feeding conveyor 3; a noodle folding element 4; and a noodle folding and discharge conveyor 5. All of the above described elements are suitably mounted on a frame 6.

The dough compressing and feeding means 1, as illustrated, may comprise a pair of feed rollers 7 and 8, and a pair of feed rollers 9 and 10, the rollers 7 and 8 being the first pair through which the dough is fed and being spaced further apart than the rollers 9 and 10.

A guide roller 11 is journaled in the frame 6 between the feed rollers 9 and 10 and the stripping means 2 for guiding the dough from said rollers to said stripping means.

The dough stripping means 2 comprises a pair of circumferentially grooved and ribbed rollers 12 and 13, which rollers are so disposed that the ribs of each fit in the grooves of the other, whereby the dough as it is fed between said rollers is stripped into noodles.

The noodle feeding conveyor 3 is mounted below the stripping rollers 12 and 13 for conveying the noodles, stripped by said rollers, over the folding element 4 onto the folding and discharge conveyor 5.

The folding element 4 is mounted below the outer end of the feed conveyor 3 and above the conveyor 5 and comprises a rotatable blade 14 mounted on a horizontal shaft 15 journaled in the front end of the frame 6.

My machine may be driven by power, for example by a motor 16, through the medium of the driving mechanisms now to be described.

On the shaft 17 of said motor 16 is secured a sprocket 18 and on the frame 6 is journaled a shaft 19 on which is secured a sprocket 20. A chain 21 extends over the sprockets 18 and 20, whereby the shaft 19 is driven by the motor 16. On the shaft 19 is also secured a pinion 22 in mesh with a gear 23 secured on a shaft 24 journaled in the frame 6. The gear 23 in turn meshes with a pinion 25 secured on the journal 26 of the feed roller 9, whereby the roller 9 is driven by said gear and pinion. The roller 10 is driven from the roller 9 through intermeshing pinions 25 and 27 on the roller shafts 26 and 28 respectively of said rollers 9 and 10. The roller 7 is driven from the roller 10 through intermeshing gears 29 and 30, the gear 29 being secured on the roller shaft 28 and the gear 30 being secured on the shaft 31 of the roller 7. The roller 8 is driven from the roller 7 through intermeshing pinions 32 and 33 secured respectively on the shafts 31 and 34 of the rollers 7 and 8 respectively. The stripping roller 12 is driven from the feed roller shaft 26 through the medium of a chain 35 and sprockets 36 and 37, the sprocket 36 being secured on said shaft 26 and the sprocket 37 being secured on the shaft of said stripping roller. The feeding conveyor 3 is driven from the feed roller shaft 26 through the medium of a chain 38 and sprockets 39 and 40, the sprocket 39 being secured on the feed roller shaft 26 and the sprocket 40 on the conveyor roller shaft 41. The folding blade 14 is rotated from the feed roller shaft 26 through the medium of a sprocket 42 secured on said shaft, sprocket 43, chain 44 extending over said sprockets, shaft 45 journaled on the frame 6 and carrying sprocket 43, sprocket 46 secured on shaft 45, sprocket 47 secured on the folding blade shaft 15, and chain 48 extending over said sprockets 46 and 47. The folding and discharge conveyor 5 is driven from the shaft 45 through the medium of intermeshing bevel gears 49 and 50 and the shaft 51 on which one of the rollers 52 of said conveyor is secured, the bevel gear 49 being secured on the shaft 45 and the bevel gear 50 being secured on the conveyor shaft 51. The other roller 53 of the folding and discharge conveyor 5 is driven from the conveyor drive shaft 51 through the medium of sprockets 54 and 55 and a chain 56, the sprocket 54 being secured on the conveyor drive shaft 51 and the sprocket 55 being secured on the shaft 57 of the conveyor roller 53. The stripping roller 13 is driven from the stripping roller 12 through intermeshing gears 58 and 59.

The operation of my invention is as follows:

A piece of dough D is introduced between the feed rollers 7 and 8, which compress the dough and feed it between the feed rollers 9 and 10, which in turn further compress the dough and feed it over the guide roller 11 and between the stripping rollers 12 and 13 in a continuous mass. Said stripping rollers strip the continuous mass of the dough into continuous noodles N and feed said noodles downwardly onto the feeding conveyor 3, which in turn feeds said noodles forwardly and downwardly over the folding element 4 onto the folding and discharge conveyor 5. As the noodles thus pass in continuous lengths over the folding element 4 the blade 14 is rotated so that the side edges of the blade alternately engage the noodles and fold then longitudinally upon themselves on the conveyor 5, which travelling in the direction transversely of the noodles causes the noodles to be folded at an angle first in one direction and then in the other direction and in four layers as illustrated in Figs. 7 and 8. The continuous mass of folded noodles are cut in suitable lengths for storage, shipping and cooking purposes, as illustrated in Figs. 7 and 8.

I claim as my invention:

In a machine for folding noodles, means for stripping a slab of dough into noodles, a rotary blade for engaging and folding said noodles longitudinally, and a conveyor traveling transversely of the noodles upon which the noodles are folded for causing the noodles to be folded angularly, first in one direction and then in another direction.

In testimony whereof, I have signed my name to this specification at Los Angeles, California, this 16th day of April, 1932.

KARL SCHAUFLER.